United States Patent
De Vries et al.

(10) Patent No.: US 11,501,034 B2
(45) Date of Patent: Nov. 15, 2022

(54) SYSTEM AND METHOD FOR PROVIDING PREDICTION MODELS FOR PREDICTING CHANGES TO PLACEHOLDER VALUES

(71) Applicant: KONINKLIJKE PHILIPS N.V., Eindhoven (NL)

(72) Inventors: Jan Johannes Gerardus De Vries, Leende (NL); Steffen Clarence Pauws, Eindhoven (NL); Dieter Maria Alfons Van De Craen, Balen (BE); Lukas Stefan Gorzelniak, Aachen (DE); Jarno Mikael Riistama, Waalre (NL)

(73) Assignee: Koninklijke Philips N.V., Eindhoven (NL)

( * ) Notice: Subject to any disclaimer, the term of this patent is extended or adjusted under 35 U.S.C. 154(b) by 1021 days.

(21) Appl. No.: 15/980,876

(22) Filed: May 16, 2018

(65) Prior Publication Data
US 2018/0336300 A1 Nov. 22, 2018

Related U.S. Application Data

(60) Provisional application No. 62/507,957, filed on May 18, 2017.

(51) Int. Cl.
*G06Q 40/08* (2012.01)
*G06F 17/18* (2006.01)
(Continued)

(52) U.S. Cl.
CPC ............... *G06F 30/20* (2020.01); *G06F 17/18* (2013.01); *G06Q 40/08* (2013.01); *G06F 2111/10* (2020.01)

(58) Field of Classification Search
CPC ...... G06F 30/20; G06F 17/18; G06F 2111/10; G06Q 40/08
(Continued)

(56) References Cited

U.S. PATENT DOCUMENTS 9,098,810 B1 8/2015 Sangupta et al.
2011/0246155 A1 10/2011 Fitch et al.
(Continued)

OTHER PUBLICATIONS

Avanzi, Benjamin, Bernard Wong, and Xinda Yang. "A micro-level claim count model with overdispersion and reporting delays." Insurance: Mathematics and Economics 71 (2016). pp. 1-14. (Year: 2016).*

(Continued)

*Primary Examiner* — John E Johansen

(57) ABSTRACT

The present disclosure relates to a method and non-transitory machine-readable storage medium encoded with instructions for using prediction models for predicting values, the medium comprising instructions for receiving a plurality of entry identifiers, instructions for receiving a value for each of the plurality of entry identifiers, instructions for determining whether the value for each of the plurality of entry identifiers has changed and a magnitude of the change, instructions for building a model for predicting a time-to-value change, instructions for building a model for predicting a future magnitude of change, instructions for performing a simulation using the model for predicting the time-to-value change and the model for predicting the future magnitude of change and instructions for outputting a confidence interval.

22 Claims, 3 Drawing Sheets

(51) Int. Cl.
*G06F 30/20* (2020.01)
*G06F 111/10* (2020.01)

(58) Field of Classification Search
USPC .............................................................. 703/2
See application file for complete search history.

(56) References Cited

U.S. PATENT DOCUMENTS

| 2012/0066030 | A1 | 3/2012 | Limpert |
| 2013/0325195 | A1* | 12/2013 | Patterson ................. H02J 3/38 |
| | | | 700/286 |
| 2015/0134315 | A1 | 5/2015 | Sarmiento et al. |
| 2015/0301085 | A1 | 10/2015 | Bryson et al. |

OTHER PUBLICATIONS

Guiahi, Farrokh. "A probabilistic model for IBNR claims." CAS Proceedings. vol. 73. No. 139. 1986. pp. 93-107. (Year: 1986).*
Pigeon, Mathieu, Katrien Antonio, and Michel Denuit. "Individual loss reserving using paid-incurred data." Insurance: Mathematics and Economics 58 (2014). pp. 121-131. (Year: 2014).*
Lawless, J. F. "Adjustments for reporting delays and the prediction of occurred but not reported events." Canadian Journal of Statistics 22.1 (1994). pp. 15-31. (Year: 1994).*
Frederick, Carl, "WISEdash (For Districts) Dropout Early Warning System (DEWS) Dashboards", Wisconsin Department of Public Instruction, https://dpi.wi.gov/ews/dropout, accessed May 2018.

* cited by examiner

| Time 0 | | |
|---|---|---|
| Patient id | Cost id | Value |
| 1 | a | |
| 1 | b | |
| 2 | a | |
| 3 | a | |

| Time 1 month | | |
|---|---|---|
| Patient id | Cost id | Value |
| 1 | a | |
| 1 | b | |
| 2 | a | |
| 3 | a | |
| 2 | b | |
| 4 | a | |

| Time 2 month | | |
|---|---|---|
| Patient id | Cost id | Value |
| 1 | a | |
| 1 | b | |
| 2 | a | |
| 3 | a | |
| 2 | b | |
| 4 | a | |
| 1 | c | |
| 5 | a | |

FIG. 2

SYSTEM AND METHOD FOR PROVIDING PREDICTION MODELS FOR PREDICTING CHANGES TO PLACEHOLDER VALUES

CROSS-REFERENCE TO PRIOR APPLICATIONS

This application claims the benefit of U.S. Provisional Application No. 62/507,957, filed on 18 May 2017. This application is hereby incorporated by reference herein.

TECHNICAL FIELD

The present disclosure pertains to a system and method for providing prediction models for predicting changes to placeholder values.

BACKGROUND

Data analysis systems may facilitate presentation of real-time data and analysis of data. Although computer-assisted real-time data analysis systems exist, such systems may deliberately avoid consideration of certain data, such as data for a current period and/or a latest period that is still subject to change. Thus, such systems may be prone to significant errors caused by a lag period between first entry and final settlement of key performance indicators in real-time. These and other drawbacks exist.

SUMMARY

Various embodiments described herein relate to a system configured to provide stable predictions by effectuating prediction models for predicting placeholder values. The system comprises one or more processors configured by machine readable instructions and/or other components. The system is configured to obtain historical information related to one or more metrics. The historical information includes (i) placeholder values that are known to unlikely represent actual values for which the placeholder values serve as placeholders, (ii) for each of the placeholder values, one or more updated placeholder values that are revisions of the placeholder value, and (iii) timing information related to when the placeholder values are provided and when the updated placeholder values are respectively provided as revisions of the placeholder values. The system is configured to generate prediction models based on the placeholder values, the updated placeholder values, and the timing information, such that, with respect to a latest updated placeholder value for each of the placeholder values, at least one of the prediction models is configured to generate a prediction related to a potential further revision to the latest updated placeholder value within a given time window. The system is configured to generate one or more predictions based on the prediction models, the predictions being related to potential further revisions respective to the latest updated placeholder values. The system is configured to effectuate, via a user interface, presentation of the one or more predictions.

Various embodiments described herein relate to a method for providing stable predictions by effectuating prediction models for predicting placeholder values with a system. The system comprises one or more processors configured by machine readable instructions and/or other components. The method comprises obtaining, with the one or more processors, historical information related to one or more metrics. The historical information includes (i) placeholder values that are known to unlikely represent actual values for which the placeholder values serve as placeholders, (ii) for each of the placeholder values, one or more updated placeholder values that are revisions of the placeholder value, and (iii) timing information related to when the placeholder values are provided and when the updated placeholder values are respectively provided as revisions of the placeholder values. The method comprises generating, with the one or more processors, prediction models based on the placeholder values, the updated placeholder values, and the timing information, such that, with respect to a latest updated placeholder value for each of the placeholder values, at least one of the prediction models is configured to generate a prediction related to a potential further revision to the latest updated placeholder value within a given time window. The method comprises generating, with the one or more processors, one or more predictions based on the prediction models, the predictions being related to potential further revisions respective to the latest updated placeholder values. The method comprises effectuating, via a user interface, presentation of the one or more predictions.

Various embodiments described herein relate to a system for providing stable predictions by effectuating prediction models for predicting placeholder values. The system comprises means for obtaining historical information related to one or more metrics The historical information includes (i) placeholder values that are known to unlikely represent actual values for which the placeholder values serve as placeholders, (ii) for each of the placeholder values, one or more updated placeholder values that are revisions of the placeholder value, and (iii) timing information related to when the placeholder values are provided and when the updated placeholder values are respectively provided as revisions of the placeholder values. The system comprises means for generating prediction models based on the placeholder values, the updated placeholder values, and the timing information, such that, with respect to a latest updated placeholder value for each of the placeholder values, at least one of the prediction models is configured to generate a prediction related to a potential further revision to the latest updated placeholder value within a given time window. The system comprises means for generating one or more predictions based on the prediction models, the predictions being related to potential further revisions respective to the latest updated placeholder values. The system comprises means for effectuating presentation of the one or more predictions.

Various embodiments described herein relate to a non-transitory machine-readable storage medium for using prediction models for predicting values, the medium including instructions for receiving a plurality of entry identifiers, instructions for receiving a value for each of the plurality of entry identifiers, instructions for determining whether the value for each of the plurality of entry identifiers has changed and a magnitude of the change, instructions for building a model for predicting a time-to-value change, instructions for building a model for predicting a future magnitude of change, instructions for performing a simulation using the model for predicting the time-to-value change and the model for predicting the future magnitude of change and instructions for outputting a confidence interval.

In an embodiment of the present disclosure, the non-transitory machine-readable storage medium for using prediction models for predicting values, the medium comprising instructions for defining an entry time, the entry time being a first time when at least one of the plurality of entry identifiers was received.

In an embodiment of the present disclosure, the non-transitory machine-readable storage medium for using prediction models for predicting values, the medium comprising instructions for defining a time to change, the time to change being a lag time between when at least one of the plurality of entry identifiers was received and when a change in the value for at least one of the plurality of entry identifiers was received.

In an embodiment of the present disclosure, the time to change is defined as $$D = \{d_1, \ldots, d_{n_{t_{max}}}\}$$

where $d_m = \min(\mathrm{argmax}_i c_{m^i}, t_{max}) - e_m$.

In an embodiment of the present disclosure, the change, $C^i$ is determined by $$C^i = \{c_{p_j^i}\}$$

where $$c_{p_j^i} = \begin{cases} 1 & \text{if } v_{p_j^i} \neq v_{p_j^{i+1}} \\ 0 & \text{else} \end{cases},$$

where v is the value for each of the plurality of entry identifiers.

In an embodiment of the present disclosure, the model for predicting a time-to-change model is a Poisson process model.

In an embodiment of the present disclosure, the model for predicting a time-to-change model is a Cox regression model.

In an embodiment of the present disclosure, the model for predicting the time-to-change outputs a probability that the value for each of the plurality of entry identifiers will change.

In an embodiment of the present disclosure, the model for predicting the future magnitude of change is a first order statistic model of the magnitude of change.

In an embodiment of the present disclosure, the magnitude of change, $\Delta V$ is defined as $$\Delta V = \{v_{p(t_m + d_m)} - v_{p^t m}\}$$

for each of the plurality of entry identifiers with $c_p = 1$ in any $C^i$, where v is the value for each of the plurality of entry identifiers, c is the change and t is the time value.

In an embodiment of the present disclosure, the simulation using the model for predicting the time-to-value change and the model for predicting the future magnitude of change is a Monte Carlo simulation.

In an embodiment of the present disclosure, the simulation changes the magnitude of change using the probability that the value for each of the plurality of entry identifiers will change and the magnitude of change.

Various embodiments described herein relate to a method for providing predictions using prediction models for predicting values, the method including the steps of receiving a plurality of entry identifiers, receiving a value for each of the plurality of entry identifiers, determining whether the value for each of the plurality of entry identifiers has changed and a magnitude of the change, building a model for predicting a time-to-value change, building a model for predicting a future magnitude of change, performing a simulation using the model for predicting the time-to-value change and the model for predicting the future magnitude of change and outputting a confidence interval.

In an embodiment of the present disclosure, the method for providing predictions using prediction models for predicting values, the method further including the step of defining an entry time, the entry time being a first time when at least one of the plurality of entry identifiers was received.

In an embodiment of the present disclosure, the method for providing predictions using prediction models for predicting values, the method further including the step of defining a time to change, the time to change being a lag time between when at least one of the plurality of entry identifiers was received and when a change in the value for at least one of the plurality of entry identifiers was received.

In an embodiment of the present disclosure, the time to change is defined as $$D = \{d_1, \ldots, d_{n_{t_{max}}}\}$$

where $d_m = \min(\mathrm{argmax}_i c_{m^i}, t_{max}) - e_m$.

In an embodiment of the present disclosure, the change, $C^i$ is determined by $$C^i = \{c_{p_j^i}\}$$

where $$c_{p_j^i} = \begin{cases} 1 & \text{if } v_{p_j^i} \neq v_{p_j^{i+1}} \\ 0 & \text{else} \end{cases},$$

where v is the value for each of the plurality of entry identifiers.

In an embodiment of the present disclosure, the model for predicting a time-to-change model is a Poisson process model.

In an embodiment of the present disclosure, the model for predicting a time-to-change model is a Cox regression model.

In an embodiment of the present disclosure, the model for predicting the time-to-change outputs a probability that the value for each of the plurality of entry identifiers will change.

In an embodiment of the present disclosure, the model for predicting the future magnitude of change is a first order statistic model of the magnitude of change.

In an embodiment of the present disclosure, the future magnitude of change, $\Delta V$ is defined as $$\Delta V = \{v_{p(t_m + d_m)} - v_{p^t m}\}$$

for each of the plurality of entry identifiers with $c_p=1$ in any $C^i$, where v is the value for each of the plurality of entry identifiers, c is the change and t is the time value.

In an embodiment of the present disclosure, the simulation using the model for predicting the time-to-value change and the model for predicting the future magnitude of change is a Monte Carlo simulation.

In an embodiment of the present disclosure, the simulation changes the magnitude of change using the a probability that the value for each of the plurality of entry identifiers will change and the magnitude of change.

These and other objects, features, and characteristics of the present disclosure, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the disclosure.

BRIEF DESCRIPTION OF THE DRAWINGS

FIG. 2 illustrates data extraction at subsequent moments in time, in accordance with one or more embodiments.

DETAILED DESCRIPTION OF EXEMPLARY EMBODIMENTS

Figure 1:
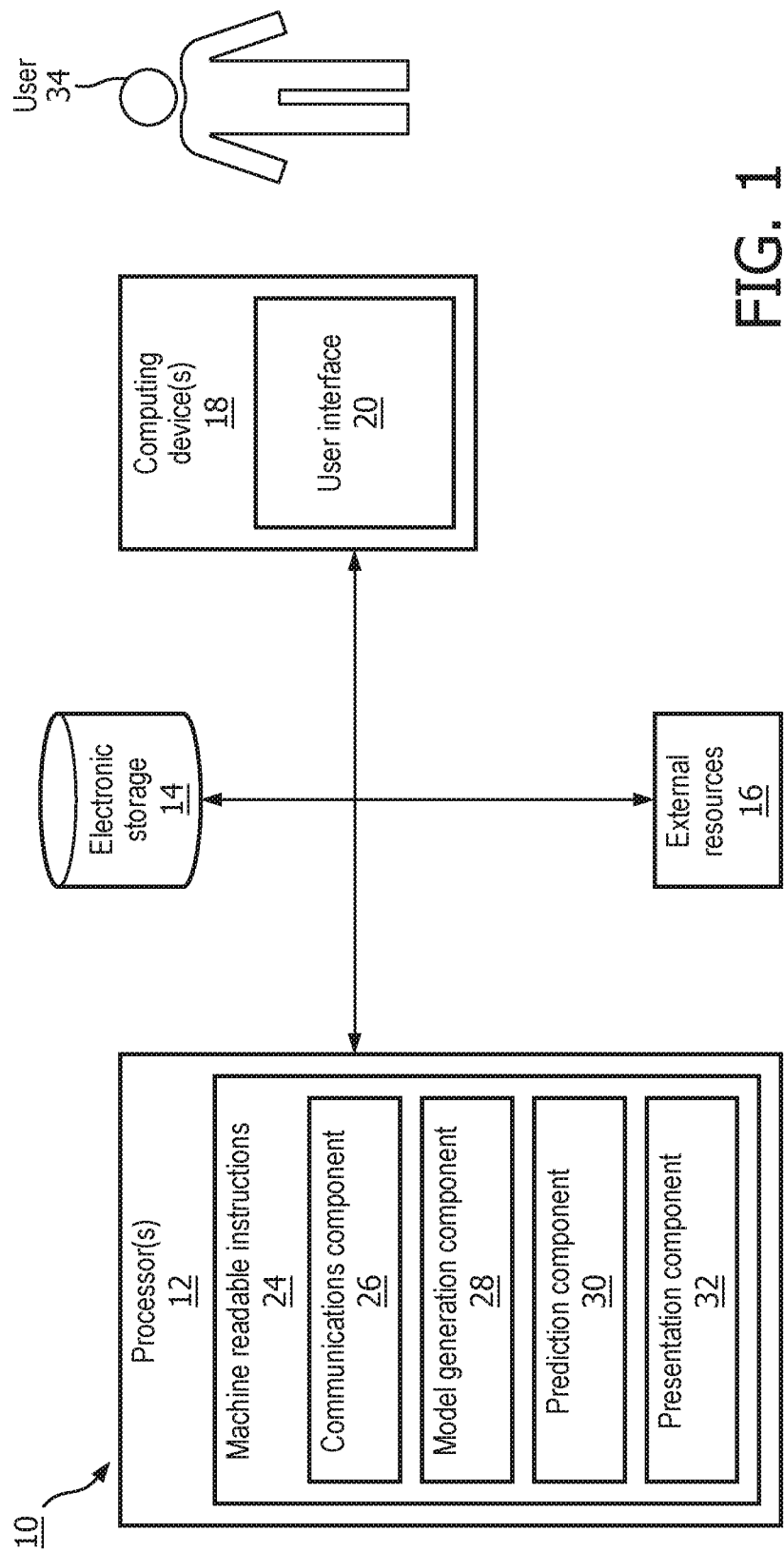
FIG. 1 illustrates a system configured to provide prediction models for predicting changes to placeholder values, in accordance with one or more embodiments.

As used herein, the singular form of "a", "an", and "the" include plural references unless the context clearly dictates otherwise. As used herein, the term "or" means "and/or" unless the context clearly dictates otherwise. As used herein, the statement that two or more parts or components are "coupled" shall mean that the parts are joined or operate together either directly or indirectly, i.e., through one or more intermediate parts or components, so long as a link occurs. As used herein, "directly coupled" means that two elements are directly in contact with each other. As used herein, "fixedly coupled" or "fixed" means that two components are coupled so as to move as one while maintaining a constant orientation relative to each other.

As used herein, the word "unitary" means a component is created as a single piece or unit. That is, a component that includes pieces that are created separately and then coupled together as a unit is not a "unitary" component or body. As employed herein, the statement that two or more parts or components "engage" one another shall mean that the parts exert a force against one another either directly or through one or more intermediate parts or components. As employed herein, the term "number" shall mean one or an integer greater than one (i.e., a plurality).

Directional phrases used herein, such as, for example and without limitation, top, bottom, left, right, upper, lower, front, back, and derivatives thereof, relate to the orientation of the elements shown in the drawings and are not limiting upon the claims unless expressly recited therein.

Data quality may include several elements, including availability of data (e.g., whether data is missing), measurement quality (e.g., margin of measurement error), whether the data is final or will be subject to change in (near) future, and/or other elements. As an example, healthcare claims data (e.g., costs, amounts reimbursed, and/or other data) may be subject to change after first entry of the data and before reaching final settlement. As such, the settlement period may persist for one or more months, one or more years, and/or other periods.

In one scenario, for instance, medical insurance claims may undergo one or more stages of processing during which payment values are subject to change. In this example, medical insurance claims may be:

incurred but not reported (IBNR) yet by the hospital (or beneficiary) in which the insurer does not yet know about the existence of the claim and the claimed amount but the hospital (or beneficiary) has already incurred the costs. As such, there is a lag time between incurred costs and reported claims in which a hospital expects a reimbursement for its cost made and an insurer needs to make an estimate on the not-yet-reported claims to reserve a budget for them;

incurred, reported but not settled (RBNS) yet in which a first payment from the insurer to the hospital is made but not settled yet to a final amount. As such, there is a lag time between a first initial payment of a reported claims and its settlement of a final payment, which may result in various changing payments of the reported claim until settlement over time;

incurred, reported, but not paid (RBNP) in which the hospital has reported the claim to the insurer, but the insurer has not decided yet on payment. As such, there is a lag time between a reported claim and its payment; or paid in which the claim has received a final payment from the insurer to the hospital; this payment may or may not differ from the claimed or incurred amount.

Systems currently available may omit data obtained during a current period and/or a latest period (e.g., last six months) in order to avoid data that is still subject to change. Other systems may assume that the data indicated as being subject to change includes finalized and correct data. However, costs and reimbursement amounts associated with the same patient and/or treatment may change dramatically from month to month. Such a change may be caused by incorrect data input, insurer negotiations, court-cases, claim settlements and various types of corrections. Changes to costs and reimbursement amounts may significantly influence data summaries such as mean, median, standard deviation, inter-quartile-range, and/or other statistics.

FIG. 1 is a schematic illustration of a system 10 configured to provide prediction models for predicting changes to placeholder values, in accordance with one or more embodiments. In some embodiments, system 10 is configured to obtain historical information corresponding to (i) placeholder values that are known to unlikely represent actual values (for which the placeholder values serve as placeholders), (ii) updated placeholder values that are revisions of the placeholder value, and (iii) timing information related to the placeholder values and the revisions. As an example, a placeholder value may include an estimated or other placeholder value that is subject to change (e.g., given that it is known that the placeholder value is unlikely an accurate representation of the final settlement value). In some embodiments, system 10 is configured to generate a prediction related to a potential revision to a placeholder value within a given time window. In some embodiments, system 10 is configured to effectuate presentation of a descriptive statistic (e.g., mean, median, mode, standard deviation, kurtosis, skewness, and/or other statistics) and a confidence interval (e.g., a range of values) corresponding to the prediction. For example, based on the stability of placeholder values in the historical information, we are 95% confident that the true descriptive statistic is within a determined range of values.

For example, system 10 may facilitate information retrieval over multiple extractions (e.g., batches or updates) of the same data and/or data from the same dynamic cohort (e.g., as patients may enter or leave the cohort because of inclusion or discontinuation of the program) taken at different points in time. As such, system 10 facilitates determining one or more of a probability of one or more changes in existing data points, a magnitude of one or more changes in existing data points, a prediction related to potential changes to existing data points, or other information.

In some embodiments, system 10 facilitates predicting a final value of an insurance claim settlement based on historical information. For example, in connection with the previously described medical insurance claims status, an insurer may, based on historical claim settlement information, (i) determine a final amount for an insurance claim and (ii) provide final payment to a healthcare facility and/or care provider and forgo a settlement period in which various changing payments of the reported claim occur over time until the claim has been settled. As such, system 10 may facilitate providing updated information corresponding to one or more metrics with more accuracy (e.g., by incorporating historical information inclusive of a current period of time) and less time lag.

In some embodiments, system 10 comprises one or more processors 12, electronic storage 14, external resources 16, computing device 18, or other components.

Electronic storage 14 comprises electronic storage media that electronically stores information (e.g., criteria, mathematical equations, predictions, etc.). The electronic storage media of electronic storage 14 may comprise one or both of system storage that is provided integrally (i.e., substantially non-removable) with system 10 and/or removable storage that is removably connectable to system 10 via, for example, a port (e.g., a USB port, a firewire port, etc.) or a drive (e.g., a disk drive, etc.). Electronic storage 14 may be (in whole or in part) a separate component within system 10, or electronic storage 14 may be provided (in whole or in part) integrally with one or more other components of system 10 (e.g., computing device 18, processor 12, etc.). In some embodiments, electronic storage 14 may be located in a server together with processor 12, in a server that is part of external resources 16, in a computing device 18, and/or in other locations. Electronic storage 14 may comprise one or more of optically readable storage media (e.g., optical disks, etc.), magnetically readable storage media (e.g., magnetic tape, magnetic hard drive, floppy drive, etc.), electrical charge-based storage media (e.g., EPROM, RAM, etc.), solid-state storage media (e.g., flash drive, etc.), and/or other electronically readable storage media. Electronic storage 14 may store software algorithms, information determined by processor 12, information received via computing devices 18 and/or graphical user interface 20 and/or other external computing systems, information received from external resources 16, and/or other information that enables system 10 to function as described herein.

External resources 16 include sources of information and/or other resources. For example, external resources 16 may include medical insurance claim information and/or other information (e.g., medical insurance claims archive of an insurer). In some embodiments, external resources 16 include health information related to a patient. In some embodiments, the health information comprises demographic information, vital signs information, medical condition information indicating medical conditions experienced by the patient, treatment information indicating treatments received by the patient, outcome information indicating health outcomes for the patient, and/or other health information. In some embodiments, external resources 16 include sources of information such as databases, websites, etc., external entities participating with system 10 (e.g., a medical records system of a health care provider that stores medical history information for populations of patients), one or more servers outside of system 10, and/or other sources of information. In some embodiments, external resources 16 include components that facilitate communication of information such as a network (e.g., the internet), electronic storage, equipment related to Wi-Fi technology, equipment related to Bluetooth® technology, data entry devices, sensors, scanners, and/or other resources. External resources 16 may be configured to communicate with processor 12, computing device 18, electronic storage 14, and/or other components of system 10 via wired and/or wireless connections, via a network (e.g., a local area network and/or the internet), via cellular technology, via Wi-Fi technology, and/or via other resources. In some embodiments, some or all of the functionality attributed herein to external resources 16 may be provided by resources included in system 10.

Computing devices 18 are configured to provide an interface between user 34 (e.g., insurance claim processors, hospital billing staff, doctors, nurses, $ad_m$ inistrators, staff members, technicians, etc.), and/or other users, and system 10. In some embodiments, individual computing devices 18 are and/or are included in desktop computers, laptop computers, tablet computers, smartphones, and/or other computing devices associated with individual caregivers 14, individual patients 12, and/or other users. In some embodiments, individual computing devices 18 are, and/or are included in equipment used in insurer's offices, hospitals, doctor's offices, and/or other facilities. Computing devices 18 are configured to provide information to and/or receive information from user 34, and/or other users. For example, computing devices 18 are configured to present a graphical user interface 20 to user 34 to facilitate entry and/or selection of a descriptive statistic and a margin of error (e.g., as described below). In some embodiments, graphical user interface 20 includes a plurality of separate interfaces associated with computing devices 18, processor 12, and/or other components of system 10; multiple views and/or fields configured to convey information to and/or receive information from user 34, and/or other users; and/or other interfaces.

In some embodiments, computing devices 18 are configured to provide user interface 20, processing capabilities, databases, or electronic storage to system 10. As such, computing devices 18 may include processor 12, electronic storage 14, external resources 16, or other components of system 10. In some embodiments, computing devices 18 are connected to a network (e.g., the internet). In some embodiments, computing devices 18 do not include processor 12, electronic storage 14, external resources 16, or other components of system 10, but instead communicate with these components via the network. The connection to the network may be wireless or wired. For example, processor 12 may be located in a remote server and may wirelessly cause presentation of the one or more predictions via the user interface to a care provider on computing devices 18 associated with that caregiver (e.g., a doctor, a nurse, a central caregiver coordinator, etc.). In some embodiments, computing devices 18 are laptops, desktop computers, smartphones, tablet computers, or other computing devices.

Examples of interface devices suitable for inclusion in user interface 20 include a camera, a touch screen, a keypad, touch sensitive or physical buttons, switches, a keyboard, knobs, levers, a display, speakers, a microphone, an indicator light, an audible alarm, a printer, tactile haptic feedback device, or other interface devices. The present disclosure also contemplates that computing devices 18 includes a removable storage interface. In this example, information may be loaded into computing devices 18 from removable storage (e.g., a smart card, a flash drive, a removable disk, etc.) that enables caregivers or other users to customize the implementation of computing device 18. Other exemplary input devices and techniques adapted for use with Computing devices 18 or the user interface include an RS-232 port, RF link, an IR link, a modem (telephone, cable, etc.), or other devices or techniques.

Processor 12 is configured to provide information processing capabilities in system 10. As such, processor 12 may comprise one or more of a digital processor, an analog processor, a digital circuit designed to process information, an analog circuit designed to process information, a state machine, or other mechanisms for electronically processing information. Although processor 12 is shown in FIG. 1 as a single entity, this is for illustrative purposes only. In some embodiments, processor 12 may comprise a plurality of processing units. These processing units may be physically located within the same device (e.g., a server), or processor 12 may represent processing functionality of a plurality of devices operating in coordination (e.g., one or more servers, computing device 18, devices that are part of external resources 16, electronic storage 14, or other devices.)

In some embodiments, processor 12, external resources 16, computing devices 18, electronic storage 14, and/or other components may be operatively linked via one or more electronic communication links. For example, such electronic communication links may be established, at least in part, via a network such as the Internet, and/or other networks. It will be appreciated that this is not intended to be limiting, and that the scope of this disclosure includes embodiments in which these components may be operatively linked via some other communication media. In some embodiments, processor 12 is configured to communicate with external resources 16, computing devices 18, electronic storage 14, and/or other components according to a client/server architecture, a peer-to-peer architecture, and/or other architectures.

As shown in FIG. 1, processor 12 is configured via machine-readable instructions 24 to execute one or more computer program components. The computer program components may comprise one or more of a communications component 26, a model generation component 28, a prediction component 30, a presentation component 32, or other components. Processor 12 may be configured to execute components 26, 28, 30, or 32 by software; hardware; firmware; some combination of software, hardware, or firmware; or other mechanisms for configuring processing capabilities on processor 12.

It should be appreciated that although components 26, 28, 30, and 32 are illustrated in FIG. 1 as being co-located within a single processing unit, in embodiments in which processor 12 comprises multiple processing units, one or more of components 26, 28, 30, or 32 may be located remotely from the other components. The description of the functionality provided by the different components 26, 28, 30, or 32 described below is for illustrative purposes, and is not intended to be limiting, as any of components 26, 28, 30, or 32 may provide more or less functionality than is described. For example, one or more of components 26, 28, 30, or 32 may be eliminated, and some or all of its functionality may be provided by other components 26, 28, 30, or 32. As another example, processor 12 may be configured to execute one or more additional components that may perform some or all of the functionality attributed below to one of components 26, 28, 30, or 32.

Communications component 26 is configured to obtain historical information related to one or more metrics. In some embodiments, the one or more metrics include one or more of medical insurance claims, (re) $ad_m$ issions to a healthcare facility, investments, sales metrics, marketing metrics, supply chain metrics, retail metrics, social media metrics, and/or other key performance indicators (KPIs). In some embodiments, the historical information includes (i) placeholder values that are known to unlikely represent actual values for which the placeholder values serve as placeholders, (ii) for each of the placeholder values, one or more updated placeholder values that are revisions of the placeholder value, and (iii) timing information related to when the placeholder values are provided and when the updated placeholder values are respectively provided as revisions of the placeholder values. In some embodiments, placeholder values include one or more values likely to be subject to change. The one or more values likely to be subject to change may not be known in advance. By way of a non-limiting example, the historical information obtained at time 0 may include values corresponding to the one or more metrics. In this example, one or more values may be subject to change; however, a determination as to which values are subject to change, when the values change, and/or how much (e.g., magnitude) the values change may not be ascertained until one or more subsequent data sets have been obtained. In some embodiments, communications component 26 is configured to continuously obtain the historical information (e.g., on a periodic basis, in accordance with a schedule, or based on other automated triggers). For example, communications component 26 is configured to obtain patient health records every month. In some embodiments, communications component is configured to continuously obtain further updated placeholder values (e.g., on a periodic basis, in accordance with a schedule, or based on other automated triggers).

By way of a non-limiting example, FIG. 2 illustrates historical information corresponding to one or more patients obtained from a hospital electronic health record (EHR), in accordance with one or more embodiments. FIG. 2 provides an illustration of data extraction at subsequent moments in time. In FIG. 2, cells having diagonal-pattern shading indicate (same) data presence and cells having solid-fill shading indicate changed data. As shown in FIG. 2, costs 'a' and 'b' associated with patient 1 have been entered at a first time (e.g., time 0). Furthermore, as evident in the data corresponding to the months subsequent to time 0, cost 'b' associated with patient 1 has been settled upon at time 0; however, as indicated in time 2, a value of cost 'a' associated with patient 1 undergoes a change.

In some embodiments, individual ones of the one or more metrics are associated with one or more attributes. In some embodiments, a first attribute and a second attribute are mutually associated with a placeholder value and an updated placeholder value (e.g., that is a revised version of the placeholder value). For example, the first attribute may include patient identification information, and the second attribute may include cost identification information. In some embodiments, communications component 26 is configured to obtain a co-variate associated with the second attribute. In some embodiments, the co-variate includes one or more of a cost item type, principal diagnosis of a user, a specific treatment group of the user, a socioeconomic status of the user, disease information associated with the user, and/or other information. For example, the type of cost item (or reported claim) may be used as a covariate that is indicative of whether the cost has been incurred from using an inpatient, outpatient or pharmacy service. As another example, the principal diagnosis (Dx) or specific treatment group (Rx) reported in the claim may be used as a covariate (e.g., in a Cox regression, the hazard rate ratio).

Returning to FIG. 1, model generation component 28 is configured to generate prediction models based on the placeholder values, the updated placeholder values, the timing information, or other information. In some embodiments, model generation component 28 is configured to determine a first entry time for an individual one of the one or more metrics in the historical information. In some embodiments, the first entry time is indicative of a first occurrence of a combination of the first attribute and the second attribute. For example, let $P^i=\{p^i_1, \ldots, p^i_{ni}\}$ be the set of $n_i$ unique entry ids extracted at time $i \in \{0, \ldots, t_{max}\}$. In connection with the example illustrated in FIG. 2, p may be indexed by the combination of patient-id and cost-id. Additional variables, other than cost-id and value, include age of patient, disease state, institute visited, etc. In this example, the entry times E may be defined as, for each first occurrence of $p_j^i$ in $P^i$, $$E = \{e_1, \ldots, e_{n_{t_{max}}}\},$$

where $t_m = \mathrm{argmin}_i \, p^i_m \in P^i$. As such, an entry time may indicate the first moment in time in which a combination of a particular patient with a particular cost item was present in a data extraction.

In some embodiments, model generation component 28 is configured to determine a time to change for an individual one of the one or more metrics in the historical information. In some embodiments, the time to change is indicative of a time lag between the first occurrence of the combination of the first attribute and the second attribute and a second occurrence of the combination of the first attribute and the second attribute. In some embodiments, the first occurrence is associated with a placeholder value. In some embodiments, the second occurrence is associated with an updated placeholder value. In some embodiments, the updated placeholder value is different from the placeholder value.

For example, let $$D = \{d_1, \ldots, d_{n_{t_{max}}}\}$$

be the set of times to change for one or more entries, wherein $d_m = \min(\mathrm{argmax}_i \, c_{m^i}, t_{max}) - e_m$.

In some embodiments, model generation component 28 is configured to determine one or more change indicators based on a comparison of a successive pair of placeholder values mutually associated with the first attribute and the second attribute. In some embodiments, the change indicators include binary (e.g. 1 if there is a change and 0 if there is no change) change indicators. In some embodiments, the successive pair of placeholder values includes a placeholder value and an updated placeholder value, an updated placeholder value and a further updated placeholder value, and/or other successive values. For example, let $V^i=\{v_p i\}$ be the values assigned to data entry $p^i$. In this example, a set of change-indicators $C^i$ may be defined as $$C^i = \{c_{p^i_j}\}$$

where $$c_{p^i_j} = \begin{cases} 1 & \text{if } v_{p^i_j} \neq v_{p^{i+1}_j} \\ 0 & \text{else} \end{cases}$$

In some embodiments, model generation component 28 is configured such that, with respect to a latest updated placeholder value for each of the placeholder values, at least one of the prediction models is configured to generate a prediction related to a potential further revision to the latest updated placeholder value within a given time window. In some embodiments, model generation component 28 is configured such that the prediction models include, with respect to a latest updated placeholder value for at least one of the placeholder values, a first prediction model configured to generate a prediction related to a probability of a potential further revision to the latest updated placeholder value within a given time window. For example, model generation component 28 is configured to use the first entry time and the time to change in a survival (time-to-event) analysis. In some embodiments, the prediction model includes one or more of a Poisson process model, a Cox regression model, and/or other models. In these models, $t_{max}$ may be used as (right-) censoring time. In some embodiments, an output of the first prediction model may be indicative of a probability $p_{change}$ of a change in the value (e.g., the placeholder value, the updated placeholder value, and/or other values) within a particular time window. In some embodiments, model generation component 28 is configured such that the predictive model takes into account characteristics of the one or more metrics to create a likelihood (e.g., a conditional probability based on the characteristics). In some embodiments, the characteristics include the co-variate obtained via communications component 26 (e.g., as described above). In some embodiments, machine learning may be used to generate probabilities using neural networks, support vector regression or other machine learning techniques.

In some embodiments, model generation component 28 is configured such that the prediction models include, with respect to a latest updated placeholder value for at least one of the placeholder values, a second prediction model configured to generate a prediction related to a magnitude of a potential further revision to the latest updated placeholder value within a given time window. For example, let $$\Delta V = \{v_{p(t_m + d_m)} - v_{p^i m}\}$$

be a set of magnitudes of the change in value in case a change happens. In this example ΔV may be defined for all p with $c_p=1$ in any $C^i$. In some embodiments, the prediction model includes one or more of a first order statistic (e.g., a mean or a median) of ΔV, a linear regression model that predicts ΔV based upon characteristics assigned (including but not limited to v) to the data entries represented in ΔV, and/or other models.

In some embodiments, model generation component 28 is configured to, based on a third prediction model, determine the probability of a change for the next data extraction. In some embodiments, the third prediction model includes a logistic regression model and/or other models. For example, model generation component 28 may facilitate determining a value corresponding to an updated placeholder, a further updated placeholder, and/or other values given a fixed time horizon. In this example, the fixed time horizon may include a month, two months, one year, and/or other future times from a current time.

In some embodiments, model generation component 28 is configured to generate a fourth prediction model based on recurrent changes if the data are expected to change in value more than once. In some embodiments, the fourth prediction model includes the Anderson-Gill method and/or other models. For example, model generation component 28 may facilitate determining a number of readmissions to a healthcare facility during a predetermined period (e.g., 30 days) and costs associated with the recurring readmissions for a patient.

In some embodiments, one or more of the first prediction model, the second prediction model, the third prediction model, or the fourth prediction model may be and/or include a support vector regression, decision trees/forests, a regression learning vector quantization, a k-nearest neighbor regression, and/or other models.

In some embodiments, one or more of the first prediction model, the second prediction model, the third prediction model, or the fourth prediction model may be and/or include a neutral network that is trained and utilized for generating predictions (described below). As an example, neural networks may be based on a large collection of neural units (or artificial neurons). Neural networks may loosely mimic the manner in which a biological brain works (e.g., via large clusters of biological neurons connected by axons). Each neural unit of a neural network may be connected with many other neural units of the neural network. Such connections can be enforcing or inhibitory in their effect on the activation state of connected neural units. In some embodiments, each individual neural unit may have a summation function which combines the values of all its inputs together. In some embodiments, each connection (or the neutral unit itself) may have a threshold function such that the signal must surpass the threshold before it is allowed to propagate to other neural units. These neural network systems may be self-learning and trained, rather than explicitly programmed, and can perform significantly better in certain areas of problem solving, as compared to traditional computer programs. In some embodiments, neural networks may include multiple layers (e.g., where a signal path traverses from front layers to back layers). In some embodiments, back propagation techniques may be utilized by the neural networks, where forward stimulation is used to reset weights on the "front" neural units. In some embodiments, stimulation and inhibition for neural networks may be more free-flowing, with connections interacting in a more chaotic and complex fashion.

In some embodiments, model generation component 28 is configured to update the prediction models based on (i) at least some further updated placeholder values that are revisions respectively to at least some of the updated placeholder values, (ii) further timing information related to when the one or more further updated placeholder values are respectively provided as revisions of the at least some updated placeholder values, or (iii) other information (e.g., other historical information described herein). In some embodiments, model generation component 28 is configured to automatically update the prediction models responsive to updated placeholder values, further updated placeholder values, and/or other information being obtained. For example, the prediction models may be updated such that values corresponding to updated placeholders (e.g., values present in time 2) are replaced with values corresponding to further updated placeholder values (e.g., values to be received in time 3). As another example, the prediction models may be used to generate predictions using placeholder values that are known to unlikely represent actual values such that data for a current period and/or a latest period is incorporated in determining the prediction models. In this example, responsive to obtaining updated placeholder values that are revisions of the placeholder value, model generation component 28 is configured to update the prediction models with the updated placeholder values to facilitate more accurate predictions. As such, model generation component 28 is configured to provide dynamic prediction models in which updated placeholder values (e.g., values that are more likely to represent actual values) are used to update the prediction models in order to (i) automatically detect the level of stability of a dataset, (ii) provide predictions for the uncertainty due to instability of data, and (iii) provide predictions using more stable data.

Prediction component 30 is configured to generate one or more predictions based on the prediction models. In some embodiments, the predictions are related to potential further revisions respective to the latest updated placeholder values. In some embodiments, prediction component 30 is configured to determine a confidence interval for a descriptive statistic (e.g., mean, median, mode, standard deviation, kurtosis, skewness, and/or other statistics) corresponding to an individual one of the one or more metrics based on the first model and the second model. In some embodiments, prediction component 30 is configured to determine the confidence interval based on a Monte Carlo simulation of the first model and the second model. For example, an average value of $V^i$ in month i is calculated as $$\frac{1}{n}\Sigma v_i.$$

In this example, a Monte Carlo simulation may be used to change the values in $V^i$ with probability $p_{change}$ and magnitude ΔV. In some embodiments, the determination of the average value $V^i$ and the Monte Carlo simulation is repeated for a predetermined number of times such that a distribution of the statistic is obtained. In some embodiments, prediction component 30 is configured to determine a confidence interval and/or other measures of margin-of-error for the statistic based on the determined distribution. In some embodiments, prediction component 30 is configured to automatically generate one or more predictions responsive to a determination that a placeholder value is unlikely to represent actual values for which the placeholder value serves as a placeholder (e.g., data corresponding to a current period, data undergoing recurrent changes, and/or other information).

In order to provide predictions using prediction models for predicting values, the method identifies when a change occurs to the values and with what magnitude. After the change is determined, a model is built for predicting time-to-value change. After building the model for predicting the time-to-value change, a model is built for predicting a magnitude of change. After building the time-to-value change model and the magnitude of change model, these two models are used in a Monte Carlo simulation to derive a margin-of-error for the statistic (i.e. a confidence value).

Presentation component 32 is configured to effectuate, via user interface 20, presentation of the one or more predictions. In some embodiments, presentation component 32 is configured to effectuate, via user interface 20, presentation of the descriptive statistic and the confidence interval. As such, presentation component 32 may facilitate determination of an influence of data changes on the descriptive statistic. In some embodiments, presentation component 32 may effectuate presentation of the one or more predictions, the descriptive statistic, the confidence interval, and/or other information via a webpage, a clinical dashboard, a spreadsheet (e.g., Excel), a statistical software package (e.g., SPSS, STATA) and/or other interfaces. For example, presentation component 32 may effectuate presentation of the one or more predictions, the descriptive statistic, the confidence interval, and/or other information via a scatter plot, a chart, a histogram, a table, and/or other plots. In connection with the previously described medical insurance claims status, hospital administration may be presented with a predicted final payment value from an insurer for one or more medical insurance claims (e.g., medical insurance claims previously submitted by the hospital) along with a measure of margin of error based on historical information corresponding to the hospital's current and previous medical claim settlements. As another example, a patient seeking a particular treatment may be presented with a predicted reimbursement amount from an insurer based on previous treatments received by the patient (e.g., for similar treatments and/or different treatments) or other patients (e.g., other patients currently receiving similar treatments and/or patients who previously received similar treatments). Presentation component 32 may be configured to facilitate selection by user 34 and/or other users of the plots and/or the information presented via user interface 20. In some embodiments, presentation component 32 is configured to automatically effectuate presentation of a predetermined descriptive statistic and a predetermined measure of margin of error.

Figure 3:
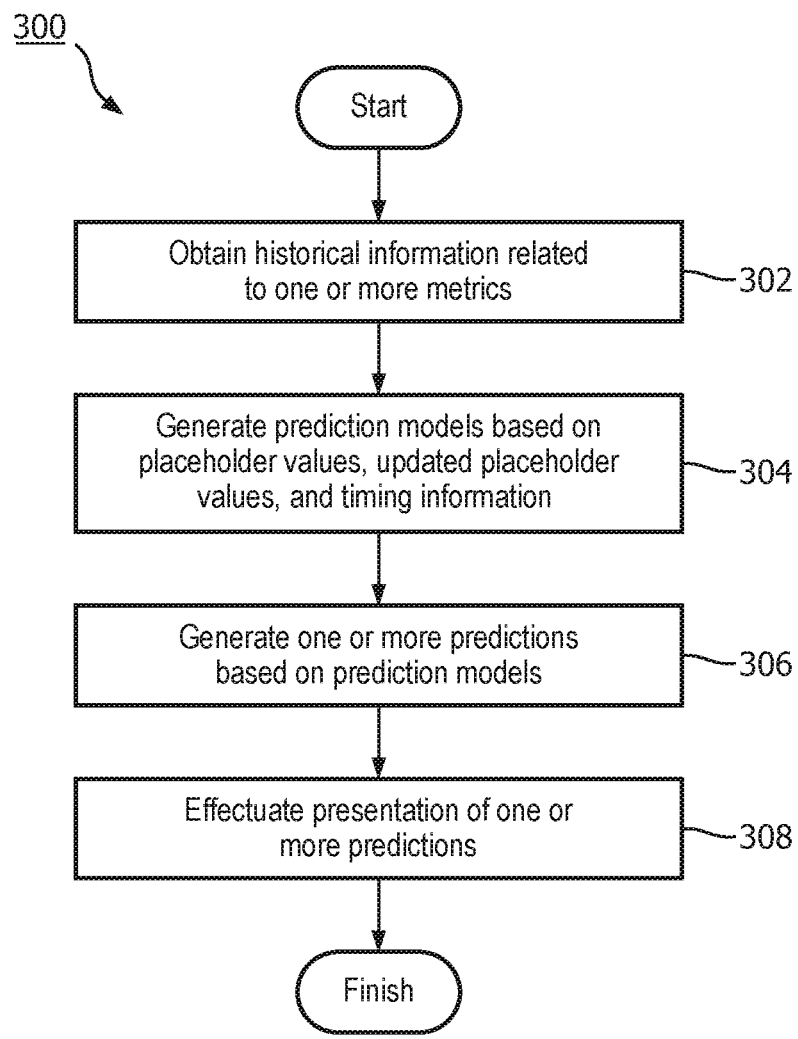
FIG. 3 illustrates a method for providing prediction models for predicting changes to placeholder values, in accordance with one or more embodiments.

FIG. 3 illustrates a method 300 for providing prediction models for predicting changes to placeholder values with a system. The system comprises one or more processors and/or other components. The one or more processors are configured by machine readable instructions to execute computer program components. The computer program components include a communications component, a model generation component, a prediction component, a presentation, and/or other components. The operations of method 300 presented below are intended to be illustrative. In some embodiments, method 300 may be accomplished with one or more additional operations not described, and/or without one or more of the operations discussed. Additionally, the order in which the operations of method 300 are illustrated in FIG. 3 and described below is not intended to be limiting.

In some embodiments, method 300 may be implemented in one or more processing devices (e.g., a digital processor, an analog processor, a digital circuit designed to process information, an analog circuit designed to process information, a state machine, and/or other mechanisms for electronically processing information). The one or more processing devices may include one or more devices executing some or all of the operations of method 300 in response to instructions stored electronically on an electronic storage medium. The one or more processing devices may include one or more devices configured through hardware, firmware, and/or software to be specifically designed for execution of one or more of the operations of method 300.

At an operation 302, historical information related to one or more metrics is obtained. In some embodiments, the historical information includes (i) placeholder values that are known to unlikely represent actual values for which the placeholder values serve as placeholders, (ii) for each of the placeholder values, one or more updated placeholder values that are revisions of the placeholder value, and (iii) timing information related to when the placeholder values are provided and when the updated placeholder values are respectively provided as revisions of the placeholder values. In some embodiments, operation 302 is performed by a processor component the same as or similar to communications component 26 (shown in FIG. 1 and described herein).

At an operation 304, prediction models are generated based on the placeholder values, the updated placeholder values, and the timing information, such that, with respect to a latest updated placeholder value for each of the placeholder values, at least one of the prediction models is configured to generate a prediction related to a potential further revision to the latest updated placeholder value within a given time window. In some embodiments, operation 304 is performed by a processor component the same as or similar to model generation component 28 (shown in FIG. 1 and described herein).

At an operation 306, one or more predictions are generated based on the prediction models. In some embodiments, the predictions are related to potential further revisions respective to the latest updated placeholder values. In some embodiments, operation 306 is performed by a processor component the same as or similar to prediction component 30 (shown in FIG. 1 and described herein).

At an operation 308, the one or more predictions are presented. In some embodiments, operation 308 is caused by a processor component the same as or similar to presentation component 32 (shown in FIG. 1 and described herein).

In the claims, any reference signs placed between parentheses shall not be construed as limiting the claim. The word "comprising" or "including" does not exclude the presence of elements or steps other than those listed in a claim. In a device claim enumerating several means, several of these means may be embodied by one and the same item of hardware. The word "a" or "an" preceding an element does not exclude the presence of a plurality of such elements. In any device claim enumerating several means, several of these means may be embodied by one and the same item of hardware. The mere fact that certain elements are recited in mutually different dependent claims does not indicate that these elements cannot be used in combination.

Although the description provided above provides detail for the purpose of illustration based on what is currently considered to be the most practical and preferred embodiments, it is to be understood that such detail is solely for that purpose and that the disclosure is not limited to the expressly disclosed embodiments, but, on the contrary, is intended to cover modifications and equivalent arrangements that are within the spirit and scope of the appended claims. For example, it is to be understood that the present disclosure contemplates that, to the extent possible, one or more features of any embodiment can be combined with one or more features of any other embodiment.

What is claimed is:

1. A non-transitory machine-readable storage medium for using prediction models for predicting values related to medical insurance claims for one or more patients, the medium comprising:
   instructions for receiving a plurality of entry identifiers for the one or more patients;
   instructions for receiving a value for each of the plurality of entry identifiers;
   instructions for determining whether the received value for each of the plurality of entry identifiers has changed and a magnitude of the change;
   instructions for building a model for predicting a time-to-value change for costs of medical insurance claims for the one or more patients,
   wherein predicting the time-to-value includes outputting a probability in relation to a time to change for each of the plurality of entry identifiers and
   wherein the time to change is defined as $$D = \{d_1, \ldots, d_{n_{t_{max}}}\}$$

where $d_m = \min(\operatorname{argmax}_i c_{m^i}, t_{max}) - e_m$ and wherein, $d_1$ is a first time-to-change value for a first entry identifier of the plurality of entry identifiers, $$d_{n_{t_{max}}}$$

is a second time-to-change value for a second entry identifier of the plurality of entry identifiers at a maximum censoring time, $c_{m^i}$ is a change-indicator for an entry identifier of the plurality of entry identifiers at a time i, $t_{max}$ is a censoring time, $e_m$ is an entry time for an entry identifier, and $d_m$ is a minimum time-to-change value;
   instructions for building a model for predicting a future magnitude of change for the costs of the medical insurance claims, wherein predicting the future magnitude of change includes outputting a probability in relation to the future magnitude of change for each of the plurality of entry identifiers;
   instructions for performing a simulation using both the model for predicting the time-to-value change and the model for predicting the future magnitude of change, and
   instructions for outputting a confidence interval,
   wherein the output probabilities and confidence interval comprises payment information for the costs of the medical insurance claims and a measure of margin of error.

2. The non-transitory machine-readable storage medium for using prediction models for predicting values of claim 1, the medium further comprising:
   instructions for defining an entry time, the entry time being a first time when at least one of the plurality of entry identifiers was received.

3. The non-transitory machine-readable storage medium for using prediction models for predicting values of claim 2, the medium further comprising:
   instructions for defining a time to change, the time to change being a lag time between when at least one of the plurality of entry identifiers was received and when a change in the value for at least one of the plurality of entry identifiers was received.

4. The non-transitory machine-readable storage medium for using prediction models for predicting values of claim 1, wherein the change, $C^i$ is determined by $$C^i = \{c_{p_j^i}\}$$

where $$c_{p_j^i} = \begin{cases} 1 & \text{if } v_{p_j^i} \neq v_{p_j^{i+1}} \\ 0 & \text{else} \end{cases},$$

where v is the value for each of the plurality of entry identifiers, and wherein $c_{p_j^i}$ is a change-indicator for a pair of successive values for each of the plurality of entry identifiers, $v_{p_j^i}$ is the value for a given entry identifier of the plurality of entry identifiers, and $v_{p_j^{i+1}}$ is a successive value for the given entry identifier of the plurality of entry identifiers.

5. The non-transitory machine-readable storage medium for using prediction models for predicting values of claim 1, wherein the model for predicting a time-to-change model is a Poisson process model.

6. The non-transitory machine-readable storage medium for using prediction models for predicting values of claim 1, wherein the model for predicting a time-to-change model is a Cox regression model.

7. The non-transitory machine-readable storage medium for using prediction models for predicting values of claim 1, wherein the model for predicting the time-to-change outputs a probability that the value for each of the plurality of entry identifiers will change.

8. The non-transitory machine-readable storage medium for using prediction models for predicting values of claim 1, wherein the model for predicting the future magnitude of change is a first order statistic model of the magnitude of change.

9. The non-transitory machine-readable storage medium for using prediction models for predicting values of claim 1, wherein the magnitude of change, $\Delta V$ is defined as $$\Delta V = \{v_{p^{(t_m+d_m)}} - v_{p^{t_m}}\}$$

for each of the plurality of entry identifiers with $c_p=1$ in any $C^i$, where v is the value for each of the plurality of entry identifiers, c is the change, t is the time value, $$v_{p^{(t_m+d_m)}}$$

is the value for a first entry identifier of the plurality of entry identifiers at a minimum time period and a minimum time to change value, and $$v_{p^{t_m}}$$

is the value for the first entry identifier of the plurality of entry identifiers at the minimum time period.

10. The non-transitory machine-readable storage medium for using prediction models for predicting values of claim 1, wherein the simulation using the model for predicting the time-to-value change and the model for predicting the future magnitude of change is a Monte Carlo simulation.

11. The non-transitory machine-readable storage medium for using prediction models for predicting values of claim 10, wherein the simulation changes the magnitude of change using the probability that the value for each of the plurality of entry identifiers will change and the magnitude of change.

12. A method for providing predictions using prediction models for predicting values related to medical insurance claims for one or more patients, the method comprising the steps of:
- receiving a plurality of entry identifiers for the one or more patients;
- receiving a value for each of the plurality of entry identifiers;
- determining whether the received value for each of the plurality of entry identifiers has changed and a magnitude of the change;
- building a model for predicting a time-to-value change for costs of medical insurance claims for the one or more patients,
  - wherein predicting the time-to-value includes outputting a probability in relation to a time to change for each of the plurality of entry identifiers, and
  - wherein the time to change is defined as $$D = \{d_1, \ldots, d_{n_{t_{max}}}\}$$

where $d_m = \min(\operatorname{argmax}_i c_{m^i}, t_{max}) - e_m$ and wherein, di is a first time-to-change value for a first entry identifier of the plurality of entry identifiers, $$d_{n_{t_{max}}}$$

is a second time-to-change value $n_{tmax}$ for a second entry identifier of the plurality of entry identifiers at a maximum censoring time, $c_{m^i}$ is a change-indicator for an entry identifier of the plurality of entry identifiers at a time i, $t_{max}$ is a censoring time, $e_m$ is an entry time for an entry identifier, and $d_m$ is a minimum time-to-change value;
- building a model for predicting a future magnitude of change for the costs of the medical insurance claims, wherein predicting the future magnitude of change includes outputting a probability in relation to the future magnitude of change for each of the plurality of entry identifiers;
- performing a simulation using both the model for predicting the time-to-value change and the model for predicting the future magnitude of change, and outputting a confidence interval,
  - wherein the output probabilities and confidence interval comprises payment information for the costs of the medical insurance claims and a measure of margin of error.

13. The method for providing predictions using prediction models for predicting values of claim 12, the method further comprising the step of:
- defining an entry time, the entry time being a first time when at least one of the plurality of entry identifiers was received.

14. The method for providing predictions using prediction models for predicting values of claim 13, the method further comprising the step of:
- defining a time to change, the time to change being a lag time between when at least one of the plurality of entry identifiers was received and when a change in the value for at least one of the plurality of entry identifiers was received.

15. The method for providing predictions using prediction models for predicting values of claim 13, wherein the change, C' is determined by $$C^i = \{c_{p_j^i}\}$$

where $$c_{p_j^i} = \begin{cases} 1 & \text{if } v_{p_j^i} \neq v_{p_j^{i+1}} \\ 0 & \text{else} \end{cases},$$

where v is the value for each of the plurality of entry identifiers, and wherein $c_{p^i}$ is a change-indicator for a pair of successive values for each of the plurality of entry identifiers, $v_{p^i}$ is the value for a given entry identifier of the plurality of entry identifiers, and $v_{p^{i+1}}$ is a successive value for the given entry identifier of the plurality of entry identifiers.

16. The method for providing predictions using prediction models for predicting values of claim 13, wherein the model for predicting a time-to-change model is a Poisson process model.

17. The method for providing predictions using prediction models for predicting values of claim 13, wherein the model for predicting a time-to-change model is a Cox regression model.

18. The method for providing predictions using prediction models for predicting values of claim 13, wherein the model for predicting the time-to-change outputs a probability that the value for each of the plurality of entry identifiers will change.

19. The method for providing predictions using prediction models for predicting values of claim 13, wherein the model for predicting the future magnitude of change is a first order statistic model of the magnitude of change.

20. The method for providing predictions using prediction models for predicting values of claim 13, wherein the future magnitude of change, $\Delta V$ is defined as $$\Delta V = \{v_{p(t_m + d_m)} - v_{p t_m}\}$$

for each of the plurality of entry identifiers with $c_p = 1$ in any $C^i$, where v is the value for each of the plurality of entry identifiers, c is the change, t is the time value, $$v_{p(t_m + d_m)}$$

is the value for a first entry identifier of the plurality of entry identifiers at a minimum time period and a minimum time to change value, and $$v_{p t_m}$$

is the value for the first entry identifier of the plurality of entry identifiers at the minimum time period.

21. The method for providing predictions using prediction models for predicting values of claim 13, wherein the simulation using the model for predicting the time-to-value change and the model for predicting the future magnitude of change is a Monte Carlo simulation.

22. The method for providing predictions using prediction models for predicting values of claim 21, wherein the simulation changes the magnitude of change using the probability that the value for each of the plurality of entry identifiers will change and the magnitude of change.

* * * * *